(12) United States Patent
Yu et al.

(10) Patent No.: US 12,527,646 B2
(45) Date of Patent: Jan. 20, 2026

(54) IMPLANTING SLEEVE WITH FUNCTION OF AXIAL DIRECTION CHECKING

(71) Applicant: SICHUAN UNIVERSITY, Sichuan (CN)

(72) Inventors: Haiyang Yu, Sichuan (CN); Chenyang Xie, Sichuan (CN); Tinglu Fang, Sichuan (CN); Qin Wu, Sichuan (CN)

(73) Assignee: SICHUAN UNIVERSITY, Chengdu (CN)

( * ) Notice: Subject to any disclaimer, the term of this patent is extended or adjusted under 35 U.S.C. 154(b) by 292 days.

(21) Appl. No.: 18/269,298

(22) PCT Filed: Mar. 11, 2022

(86) PCT No.: PCT/CN2022/080316
§ 371 (c)(1),
(2) Date: Jun. 23, 2023

(87) PCT Pub. No.: WO2022/206338
PCT Pub. Date: Oct. 6, 2022

(65) Prior Publication Data
US 2024/0041560 A1     Feb. 8, 2024

(30) Foreign Application Priority Data
Mar. 29, 2021 (CN) .......................... 202120632287.5

(51) Int. Cl.
*A61C 1/08*     (2006.01)
(52) U.S. Cl.
CPC .................................... *A61C 1/084* (2013.01)
(58) Field of Classification Search
CPC ......... A61C 1/082; A61C 1/084; A61C 1/085; A61C 8/0089; A61C 3/04
See application file for complete search history.

(56) References Cited

U.S. PATENT DOCUMENTS

| | | | |
|---|---|---|---|
| 7,905,726 B2* | 3/2011 | Stumpel ................. | A61C 1/084 433/196 |
| 2009/0202959 A1 | 8/2009 | Ajlouni et al. | |
| 2016/0030135 A1* | 2/2016 | Liu ........................ | A61C 1/084 433/75 |

FOREIGN PATENT DOCUMENTS

CN     107647929 A     2/2018

OTHER PUBLICATIONS

International Search Report of PCT Patent Application No. PCT/CN2022/080316 issued on May 20, 2022.

* cited by examiner

*Primary Examiner* — Eric J Rosen
*Assistant Examiner* — Sydney J Pulvidente

(57) ABSTRACT

The present disclosure discloses an implanting sleeve with function of axial direction checking, relates to the technical field of oral medical instruments, and has the functions of guiding and axial direction checking. The implanting sleeve comprises a sleeve body which can be detachably disposed on a guide plate, the sleeve body is provided with a center hole which allows an implant drill or an implant to pass through, the sleeve body extends and is provided with an extension arm, and a measurement component used for checking the axial direction of the implant drill or the implant is connected to the side of the extension arm away from the guide plate. Through the arrangement of the center hole, the implant drill is guided, and by using of the measurement component, the axial direction of the drilling needle is simply and quickly checked.

4 Claims, 3 Drawing Sheets

IMPLANTING SLEEVE WITH FUNCTION OF AXIAL DIRECTION CHECKING

TECHNICAL FIELD

The present disclosure relates to an oral medical instruments technology field, in particular to an implanting sleeve with function of axial direction checking.

BACKGROUND

With the development of computer-aided design and computer-aided manufacturing technology in the field of oral implantology, digital implant guides are increasingly used to accurately transfer the preoperative design to the surgical operation. In practice, gaps between the components, the special anatomical structure of the implant site, such as the fresh extraction socket and the hard cortical bone, can bring deviation of the axial direction of the implant drill during the cavity preparation and of the implant during the implantation. However, at present there is no method that can be used to check the axial direction in real time during operation, and the subjective deviation based on the experiential judgment of the surgeon alone is large, which is disconnected from digital design, and cannot play the advantages of digital technology itself. Moreover, most of the full guidance of the existing digital implant guide plate is realized by the combined application of a sleeve with the fixed inner diameter and a drill key with an appropriate outer diameter, the combined manner includes three interfaces of the sleeve and the guide tube, the drill key and the sleeve, and the implant drill and the drill key, and the source of error is complex and uncontrollable. The other guidance method is realized relying on the combination of guided implant drill and a guide tube with a fixed inter diameter, in which there is a guided segment below the vertical stop ring of the implant drill to match the inner diameter of the guide tube, but this design sacrifices a part of working length of the implant drill, and the guidance height completely depends on the height of the guided segment of the implant drill, which is not adjustable, and it is difficult to make personalized adjustments in practical applications.

SUMMARY

The technical problem to be solved by the present disclosure is to provide an implant sleeve with the function of guidance and axial direction checking, so as to solve the problem that the immediate checking axial direction of preparation and implantation cannot be realized at present. The present disclosure provides an implanting sleeve with function of axial direction checking to solve the above problems.

The present disclosure is implemented by using following technical solutions:

An implanting sleeve with function of axial direction checking, comprises a sleeve body which can be detachably disposed on a guide plate, the sleeve body is provided with a center hole which allows an implant drill to pass through, the sleeve body extends and is provided with an extension arm in a direction away from the center hole, and a measurement component used for checking the axial direction of the implant drill is connected to the side of the extension arm away from the guide plate.

In the scheme: the guide plate is an important tool designed and made after preoperative examination and analysis before dental implant surgery, and is used for helping doctors quickly and accurately locate the implant drills and implants, and avoid medical risks during operation. When performing oral implantation, the guide plate is clamped on the teeth, and the implanting sleeves with center holes of different diameters are placed in the implant site in turn according to the implant drills of different diameter, and the implant drills pass through the center hole of the sleeve, so as to form a cavity by expanding the diameter thereof, and then the implant is implanted into the cavity. Wherein the center hole is approximately the same diameter as the implant drill or implant inserted therein, so as to guide the operation of the implant drill or implant, but during the operation, the implant drill or implant may have an axial deviation, so the extension arm and the measurement component are provided. The measurement component is used as a reference object for the axial position of the implant drill or implant, and the implant drill or implant is compared with the measurement component to determine whether the implant drill is offset. Through the arrangement of the center hole in the sleeve body, the drilling needle is guided, and with the application of the measurement component, the axial direction of the drilling needle is simply and quickly checked, which saves the operation time and improves the accuracy and safety of the operation. In addition, the arrangement of the extension arm can also facilitate the removal and wearing of the implanting sleeve, which is conducive to replacement.

In one or more examples, the measurement component comprises a measurement platform arranged in a stepped pattern, the measurement platform comprises a plurality of radial measurement planes parallel to a central axis of the center hole and a plurality of axial measuring planes perpendicular to the radial measurement planes.

In the scheme: the measurement platform comprises a stepped platform arranged in a stepped pattern, the planes parallel to the central axis of center hole on the stepped platform are radial measurement planes, the planes perpendicular to the radial measurement planes are axial measurement planes, the radial measurement planes and the axial measurement planes are connected in turn to form a stepped structure. The distance between a radial measurement plane and the central axis of the center hole has a fixed value, and the distance between an axial measurement plane and the extension arm also has a fixed value. Thus, the distance of points at different axial positions on the implant drill or implant relative to the radial measurement plane can be measured in combination with a measurement ruler, so as to obtain the tilt angle of the implant drill or implant, or directly comparing the distance of the implant drill or implant relative to the radial measurement plane with the distance of the radial measurement plane relative to the central axis of the center hole, to check whether the implant drill or implant is tilted. In addition, in the process of preparing the cavity, implant drills of different diameters are used to expand the diameter of the cavity until the implant can be placed, therefore, it is necessary to replace the implanting sleeve to ensure that the center hole in the sleeve body matches the implant drill, wherein, for the convenience of measurement, only the diameters of the center holes are different among different implanting sleeves. Wherein different radial measurement planes on the same measurement component correspond to implant drills or implants of different diameters respectively, distances between the radial measurement planes and the surface of corresponding implant drills or implants are equal and have a fixed value, at this situation, only by measuring the distance between the radial measurement plane and the surface of corresponding implant drill or implant and judging whether the distance is equal to the fixed value, whether the implant drill or implant of different diameters is deviated can be determined. By this way, the axial direction checking of the implant drill or implant can be performed simply and quickly, which saves the operation time and improves the accuracy and safety of the operation.

In one or more examples, the sleeve body extends and is provided with two extension arms, the two extension arms are respectively disposed on the opposite sides of the sleeve body, and measurement components respectively disposed thereon are symmetrical relative to the central axis of the center hole.

In the scheme: the measurement components are disposed symmetrically relative to the central axis of the center hole, at this situation, it is only necessary to measure the symmetrical radial measurement plane on the measurement component and the implant drill and implant placed in the center hole by the measurement ruler, and check whether the implant drill and implant are in the center position between the symmetrical radial measurement planes, the axial direction checking of the implant drill and implant can be completed. Meanwhile, the two symmetrically-arranged measurement components can also play a role in mutual verification, making the measurement results more accurate. This scheme allows to perform the axial direction checking of the implant drill and the implant simply and quickly, and therefore saving the operation time.

In one or more examples, the measurement component and the extension arm are detachably connected, wherein the measurement component is provided with a convex block on one side near the extension arm, and the extension arm is provided with a hole capable of clamping and connecting with the convex block.

In the scheme: by mutually matching the convex block and the hole, the measurement component and the extension arm are detachably connected, while performing the operation, the measurement component is first removed to facilitate the placement of the sleeve body and the operation of the drilling needle, after the completing the operation, the measurement component is fixed on the extension arm through the matched convex block and hole, to perform the axial direction checking of the implant drill. By making the measurement component and the extension arm be detachably connected, the measurement component can be removed when no axial direction checking is conducted, avoiding the effect of the measurement component on the placement of the sleeve body and the operation of the implant drill, so as to facilitate the operation.

In one or more examples, the guide plate is provided with a fixing hole capable of holding one end of the sleeve body away from the extension arm, and the diameter of the fixing hole is equal to the diameter of the sleeve body.

In the scheme: while performing the operation, the end of the sleeve body away from the extension arm is inserted into the fixing hole, since the diameter of the fixing hole is equal to the diameter of the sleeve body, it can ensure that the position of the sleeve body in the fixing hole is fixed, and is limited by the fixing hole to move except rotation, so as to ensure that the position of the implant drill or implant guided by the sleeve body during the operation is accurate and the sleeve body is not easy to fall off, which improves the accuracy and safety of the operation, at the same time, this connection mode allows the implanting sleeve to be positioned simply and quickly, saving operating time.

In one or more examples, the extension arm is provided with a reduced diameter segment, and the guide plate is provided with a clamping component capable of clamping and connecting with the reduced diameter segment.

In the scheme: the reduced diameter segment is a narrow part of the extension arm, the guide plate is provided with the clamping component capable of connecting and clamping on both sides of the reduced diameter section, so as to limit the rotation of the extension arm and its connected sleeve body, combined with the fixed hole, which can ensure that the position of the sleeve body on the guide plate is fixed, so that it can be accurately relocated on the guide plate according to the virtual design to ensure its stability in preparation.

In one or more examples, the reduced diameter segment is located at one end of the extension arm connected to the sleeve body.

In the scheme: the reduced diameter segment is disposed at the end of the extension arm connected to the sleeve body to facilitate the arrangement of the clamping component.

BRIEF DESCRIPTION OF DRAWINGS

The drawings described herein are intended to provide a further understanding of examples of the present disclosure, form part of the present disclosure, and do not constitute a limitation of examples of the present disclosure. In the drawings.

DETAILED DESCRIPTION

The present disclosure is further described with examples and drawings to make the purpose, technical scheme and advantages of the present disclosure more clear. The schematic examples of the present disclosure and their descriptions are only used to explain the present disclosure, and are not used to limit the present disclosure.

EXAMPLE

Figure 1:
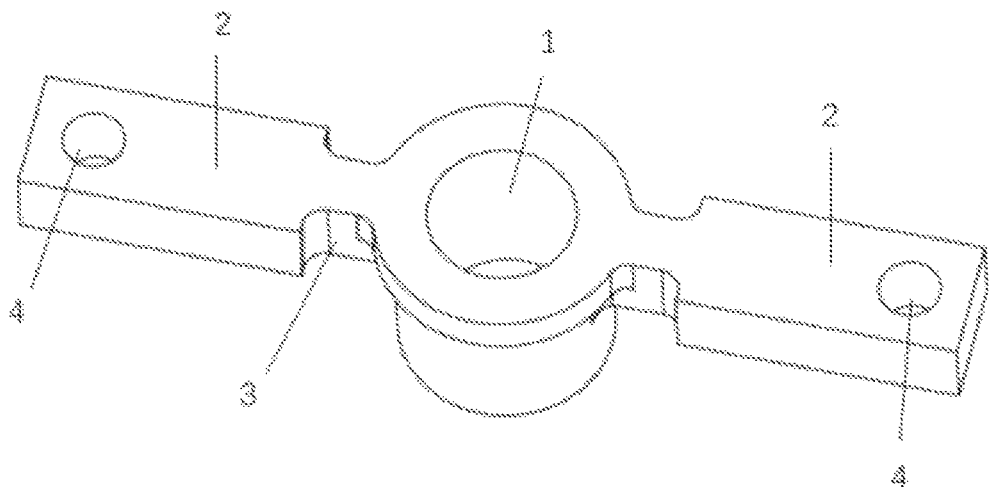
FIG. 1 is a schematic diagram of a sleeve of the present disclosure.
Figure 2:
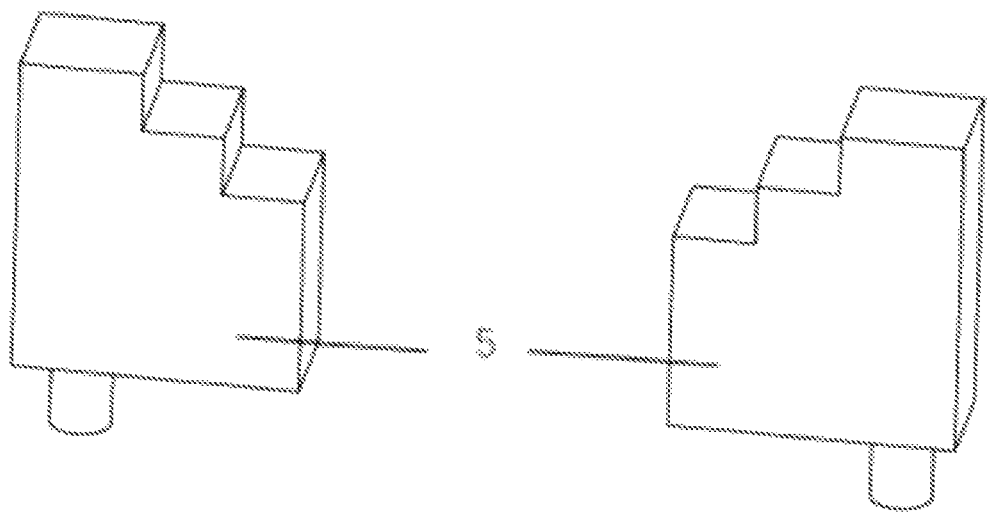
FIG. 2 is a schematic diagram of a measurement component of the present disclosure.
Figure 3:
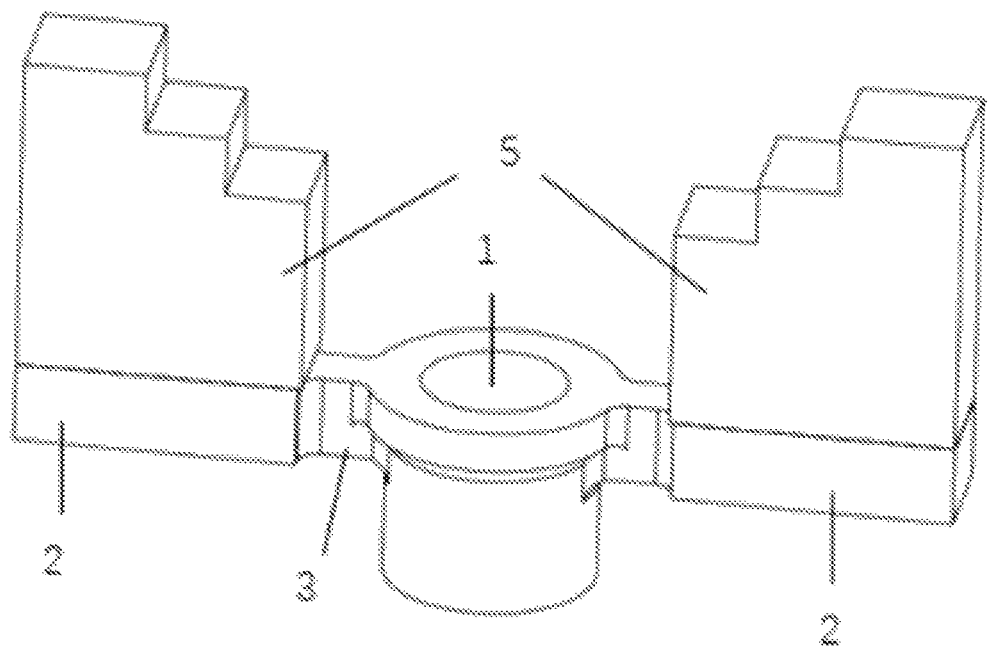
FIG. 3 is a schematic diagram of the sleeve combined with the measurement component of the present disclosure.
Figure 4:
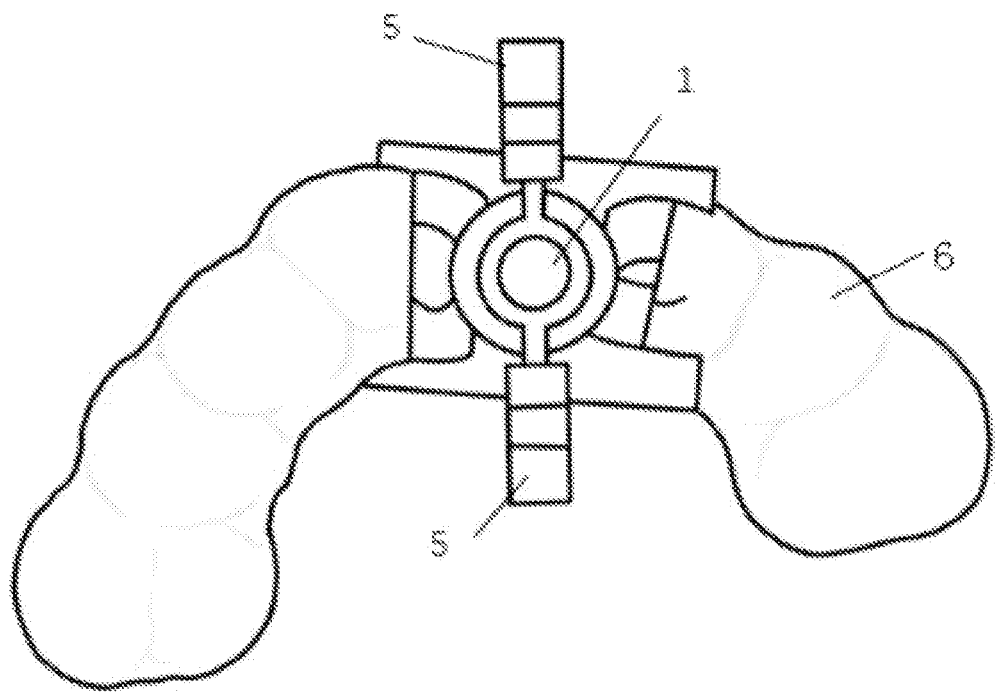
FIG. 4 is a schematic diagram of the sleeve combined with the guide plate of the present disclosure.
Figure 5:
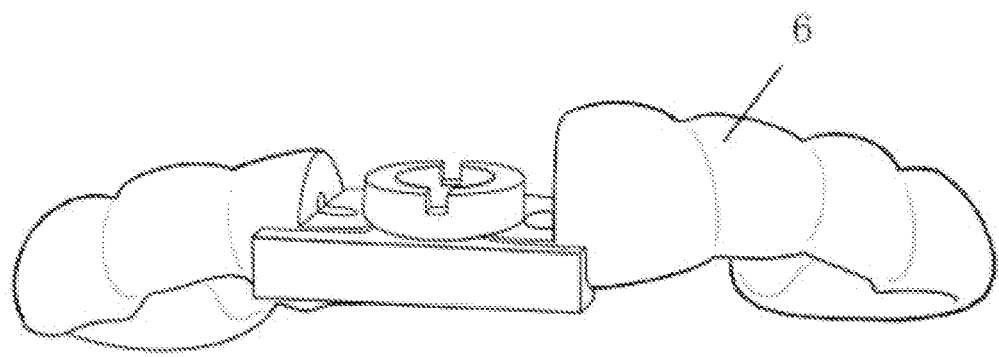
FIG. 5 is a schematic diagram of the guide plate of the present disclosure.

As shown in FIGS. 1 to 5, an implanting sleeve with function of axial direction checking, comprises a sleeve body 1 which can be detachably disposed on a guide plate 6, the sleeve body 1 is provided with a center hole which allows an implant drill or an implant to pass through, the sleeve body 1 extends and is provided with an extension arm 2 in a direction away from the center hole, and a measurement component 5 used for checking the axial direction of the implant drill or an implant is connected to the side of the extension arm away from the guide plate 6.

In the scheme: the guide plate 6 is an important tool designed and made after preoperative examination and analysis before dental implant surgery, and is used for helping doctors quickly and accurately locate implant drills and implants, and avoid medical risks during operation. When performing oral implantation, the guide plate 6 is clamped on the teeth, and the implanting sleeves with center holes of different diameters are placed in the implant site in turn according to the implant drills of different diameter, and the implant drills pass through the center hole of the sleeve, so as to form a cavity for setting the implant by expanding the diameter thereof, and then the implant is implanted into the cavity. Wherein the center hole is approximately the same diameter as the implant drill or implant inserted therein, so as to guide the operation of the implant drill or implant. But during the operation, the implant drill or implant may have an axial deviation, so the extension arm 2 and the measurement component 5 are provided, the measurement component 5 is used as a reference object for the axial position of the implant drill or implant, and the implant drill or implant is compared with the measurement component 5 to determine whether the implant drill is deviated. Through the arrangement of the center hole in the sleeve body 1, the drilling needle is guided, and through the application of the measurement component 5, the axial direction of the drilling needle is simply and quickly checked, which saves the operation time and improves the accuracy and safety of the operation. In addition, the arrangement of the extension arm 2 can also facilitate the removal and wearing of the implanting sleeve, thereby facilitating replacement.

Wherein, the measurement component 5 can be a long rod perpendicular to the extension arm 2, by measuring the distance between the measurement component 5 and the central axis of the implant drill or implant and judging whether the distance is consistent to determine whether it is deviated. However, considering that the implant drill needs to be replaced during an implanting process, and the control of the central axis is not easy, so in one or more examples, the measurement component 5 comprises a measurement platform arranged in a stepped pattern, the measurement platform comprises a plurality of radial measurement planes parallel to a central axis of the center hole and a plurality of axial measuring planes perpendicular to the radial measurement planes.

In the scheme: the measurement component comprises a stepped platform arranged in a stepped pattern, the planes parallel to the central axis of center hole on the stepped platform are radial measurement planes, the planes perpendicular to the radial measurement planes are axial measurement planes, the radial measurement planes and the axial measurement planes are connected in turn to form a stepped structure. The distance between a radial measurement plane and the central axis of the center hole has a fixed value, and the distance between an axial measurement plane and the extension arm also has a fixed value. Thus, the distance of points at different axial positions on the implant drill or implant relative to the radial measurement plane can be measured in combination with a measurement ruler, so as to obtain the tilt angle of the implant drill or implant, or directly by comparing the distance of the implant drill or implant relative to the radial measurement plane with the distance of the radial measurement plane relative to the central axis of the center hole, to check whether the implant drill or implant is tilted. In addition, in the process of preparing the cavity, it is necessary to use implant drills of different diameters to expand the diameter of the cavity until the implant can be placed, therefore, it is necessary to replace the implanting sleeve to ensure that the center hole of the sleeve body matches the implant drill, for the convenience of measurement, only the diameters of the center holes are different among different implanting sleeves. Wherein different radial measurement planes on the same measurement component correspond to implant drills or implants of different diameters respectively, the distances between the radial measurement planes and the surface of corresponding implant drills or implants are equal and have a fixed value, at this situation, only by measuring the distance between the radial measurement plane and the surface of corresponding implant drill or implant and judging whether the distance is equal to the fixed value, whether the implant drill or implant of different diameters is deviated can be determined. By this way, the axial direction checking of the implant drill or implant can be performed simply and quickly, which saves the operation time and improves the accuracy and safety of the operation.

Further, in one or more examples, the sleeve body extends and is provided with two extension arms 2, the two extension arms 2 are respectively disposed on the opposite sides of the sleeve body 1, and measurement components 5 respectively disposed thereon are symmetrical relative to the central axis of the center hole.

In the scheme: the measurement components 5 are disposed symmetrically relative to the central axis of the center hole, at this situation, it is only necessary to measure the symmetrical radial measurement plane in the measurement component 5 and the implant drill and implant placed in the center hole by the measurement ruler, and check whether the implant drill and implant are in the center position between the symmetrical radial measurement plane, the axial direction checking of the implant drill and implant can be completed. Meanwhile, the two symmetrically-arranged measurement component can also play a role in mutual verification, making the measurement results more accurate. This method allows to perform the axial direction checking of the implant drill and the implant simply and quickly, and therefore saving the operation time.

Further, in one or more examples, the measurement component 5 and the extension arm 2 are detachably connected, wherein the measurement component 5 is provided with a convex block on one side near the extension arm 2, and the extension arm 2 is provided with a hole 4 capable of clamping and connecting with the convex block.

In the scheme: by mutually matching the convex block and the hole 4, the measurement component 5 and the extension arm 2 are detachably connected, while performing the operation, the measurement component 5 is first removed to facilitate the placement of the sleeve body 1 and the operation of the drilling needle, after completing the operation, the measurement component 5 is fixed on the extension arm 2 by matching the convex block and the hole, to perform the axial direction checking of the implant drill. By making the measurement component 5 and the extension arm 2 be detachably connected, the measurement component 5 can be removed when on axial direction checking is conducted, avoiding the effect of the measurement component 5 on the placement of the sleeve body 1 and the operation of the implant drill, so as to facilitate the operation.

Wherein the convex block and the hole 4 may be a square block or an elliptical cylinder capable of clamping to each other.

In one or more examples, the guide plate 6 is provided with a fixing hole capable of holding one end of the sleeve body 1 away from the extension arm 2, and the diameter of the fixing hole is equal to the diameter of the sleeve body 1.

In the scheme: while performing the operation, the end of the sleeve body 1 away from the extension arm 2 is inserted into the fixing hole, since the diameter of the fixing hole is equal to the diameter of the sleeve body 1, it can ensure that the position of the sleeve body 1 in the fixing hole is fixed, and will not rotate, so as to ensure that the position of the implant drill or implant guided by the sleeve body 1 during the operation is accurate and the sleeve body is not easy to fall off, which improves the accuracy and safety of the operation. At the same time, this connection mode allows the implanting sleeve to be positioned simply and quickly, saving operating time.

Further, in one or more examples, the extension arm 2 is provided with a reduced diameter segment 3, and the guide plate 6 is provided with a clamping component capable of clamping and connecting with the reduced diameter segment 3.

In the scheme: the reduced diameter segment 3 is a narrow part of the extension arm 2, the guide plate 6 is provided with a clamping component capable of connecting and clamping on both sides of the reduced diameter section 3, so as to limit the rotation of the extension arm 2 and its connected sleeve body 1, combined with the fixed hole, which can ensure that the position of the sleeve body 1 on the guide plate 6 is fixed, so that it can be accurately relocated on the guide plate 6 according to the virtual design to ensure its stability in preparation.

Further, in one or more examples, the reduced diameter segment 3 is located at one end of the extension arm 2 connected to the sleeve body 1.

In the scheme: the reduced diameter segment 3 is disposed at the end of the extension arm 2 connected to the sleeve body 1 to facilitate the arrangement of the clamping component.

Wherein, in one or more examples, the steps to use the implanting sleeve with function of axial direction checking are:

1. selecting the suitable sleeve according to the size of the implant drill, and placing the sleeve body 1 in the fixed hole, clamping the reduced diameter section 3 of the extension arm 2 in the clamping component, and performing the first drill preparation;
2. after completing the preparation by using the first drill, keeping the implant drill in the cavity, inserting the measurement component 5 into the extension arm 2 on both sides of the sleeve, selecting the axial measurement plane, comparing the gap distance between the radial measurement plane and the implant drill by using the measurement ruler, and performing the axial direction checking;
3. after confirming the correction of the axial direction of the first drill, removing the sleeve matching the first drill, replacing it with the sleeve matching the second drill, and performing the second drill preparation; and
4. after completing the second drill preparation, keeping the implant drill in the cavity, inserting the measurement component 5 into the extension arm 2 on both sides of the sleeve, selecting the axial measurement plane, comparing the gap distance between the radial measurement plane and the implant drill by using the measurement ruler, performing the axial direction checking, implanting the implant after the preparation, and checking the axial direction of the implant in the same way.

The above examples further elaborate on the object, technical solution and beneficial effects of the present disclosure, it should be understood that the above examples are only specific examples of the present disclosure, and are not used to limit the scope of protection of the present disclosure. Any modification, equivalent replacement, improvement, etc. made within the spirit and principles of the present disclosure should be included in the scope of protection of the present disclosure.

What is claimed is:

1. An implanting sleeve for guidance of a dental drill and for axial direction checking of the dental comprising:
   a sleeve body which can be detachably disposed on a guide plate, wherein the sleeve body is provided with a center body with a center hole which allows the dental drill to pass through, the sleeve body extends and is provided with a first extension arm extending in a first direction away from the center body hole, a second extension arm extending in a second direction away from the center body, the second direction being opposite of the first direction and a first measurement component and a second measurement component used for checking the axial direction of the dental drill, the first measurement component is configured to connect to an end of the first extension arm opposite the central body and the second measurement component is configured to connect to an end of the second extension arm opposite the central body,
   wherein the first measurement component and the second measurement each comprises a measurement platform arranged in a stepped pattern, the measurement platform comprises a plurality of radial measurement planes parallel to a top surface of the first extension arm and the second extension arm when connected to the first extension arm and the second extension arm respectively and a plurality of axial measuring planes perpendicular to the radial measurement planes;
   the first measurement component and the second measurement component are respectively disposed symmetrical relative to the central axis of the center hole when connected to the first extension arm and the second extension arm respectively;
   wherein the first measurement component and the second measurement component are detachably connected from the first extension arm and the second extension arm respectively, wherein each of the first measurement component and the second measurement component is provided with a convex block and each of the first extension arm and the second extension arm is respectively is provided with a hole capable of clamping and connecting with the convex block.
2. The implanting sleeve for guidance of a dental drill and for axial direction checking of the dental drill according to claim 1, wherein the implanting sleeve is detachably connected to the guide plate by providing a fixing hole on the guide plate, a diameter of the fixing hole is equal to a diameter of the center body so that the center body can be received within the fixing hole.
3. The implanting sleeve for guidance of a dental drill and for axial direction checking of the dental drill according to claim 2, wherein each of the first extension arm and the second extension arm is provided with a reduced diameter segment, and the guide plate is provided with a clamping component capable of clamping and connecting with the reduced diameter segment of each of the first extension arm and the second extension arm respectively.
4. The implanting sleeve for guidance of a dental drill and for axial direction checking of the dental drill according to claim 3, wherein the reduced diameter segment is located at one end of the first extension arm and the second extension arm respectively, the reduced diameter segment of each of the first extension arm and the second extension arm is connected to the center body.

* * * * *